(12) United States Patent
Morris

(10) Patent No.: US 8,602,437 B1
(45) Date of Patent: Dec. 10, 2013

(54) MOTORCYCLE DOLLY HITCH ASSEMBLY

(71) Applicant: Edward J. Morris, San Antonio, TX (US)

(72) Inventor: Edward J. Morris, San Antonio, TX (US)

( * ) Notice: Subject to any disclaimer, the term of this patent is extended or adjusted under 35 U.S.C. 154(b) by 0 days.

(21) Appl. No.: 13/649,216

(22) Filed: Oct. 11, 2012

(51) Int. Cl.
B60P 3/07 (2006.01)
B60R 9/10 (2006.01)

(52) U.S. Cl.
USPC .......................................... 280/402; 414/462

(58) Field of Classification Search
USPC ........ 280/402, 404, 490.1, 491.1, 491.2, 482; 414/462, 463
See application file for complete search history.

(56) References Cited

U.S. PATENT DOCUMENTS

| 5,366,338 | A | | 11/1994 | Mortensen | |
|---|---|---|---|---|---|
| 5,560,628 | A | * | 10/1996 | Horn | 280/402 |
| 5,620,197 | A | | 4/1997 | Howes | |
| 5,674,044 | A | | 10/1997 | Ranes | |
| 5,984,339 | A | * | 11/1999 | Guild | 280/402 |
| 6,164,895 | A | | 12/2000 | Croswell | |
| 6,244,813 | B1 | | 6/2001 | Cataldo | |
| 6,352,401 | B1 | | 3/2002 | LeMay | |
| 6,682,292 | B2 | * | 1/2004 | Estes | 414/462 |
| D523,779 | S | | 6/2006 | Mattila | |
| 7,188,856 | B2 | | 3/2007 | Maynard | |
| 7,318,698 | B1 | | 1/2008 | Gipson | |
| 7,704,034 | B1 | | 4/2010 | Quigley, III | |
| 7,997,606 | B1 | * | 8/2011 | Sandelius | 280/402 |
| 2007/0024024 | A1 | * | 2/2007 | Maynard | 280/402 |
| 2009/0152830 | A1 | * | 6/2009 | Berry | 280/402 |

* cited by examiner

Primary Examiner — Anne Marie M Boehler

(57) ABSTRACT

A motorcycle dolly hitch assembly couples to a vehicle to tow a motorcycle. The assembly includes a hitch arm having a first end configured for coupling to a vehicle. A support sleeve is coupled to a second end of the hitch arm. A support member has a first arm and a second arm. The second arm is slidably inserted into the support sleeve. A cradle, configured for supporting a wheel of a motorcycle, is coupled to the first arm of the support member. A locking mechanism is mechanically coupled to the second arm of the support member and the support sleeve wherein a position of the support member is lockable into a static position relative to the support sleeve.

20 Claims, 5 Drawing Sheets

MOTORCYCLE DOLLY HITCH ASSEMBLY

BACKGROUND OF THE DISCLOSURE

Field of the Disclosure

The disclosure relates to dolly devices and more particularly pertains to a new dolly device for coupling to a vehicle to tow a motorcycle.

SUMMARY OF THE DISCLOSURE

An embodiment of the disclosure meets the needs presented above by generally comprising a hitch arm having a first end configured for coupling to a vehicle. A support sleeve is coupled to a second end of the hitch arm. A support member has a first arm and a second arm. The second arm is slidably inserted into the support sleeve. A cradle, configured for supporting a wheel of a motorcycle, is coupled to the first arm of the support member. A locking mechanism is mechanically coupled to the second arm of the support member and the support sleeve wherein a position of the support member is lockable into a static position relative to the support sleeve.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
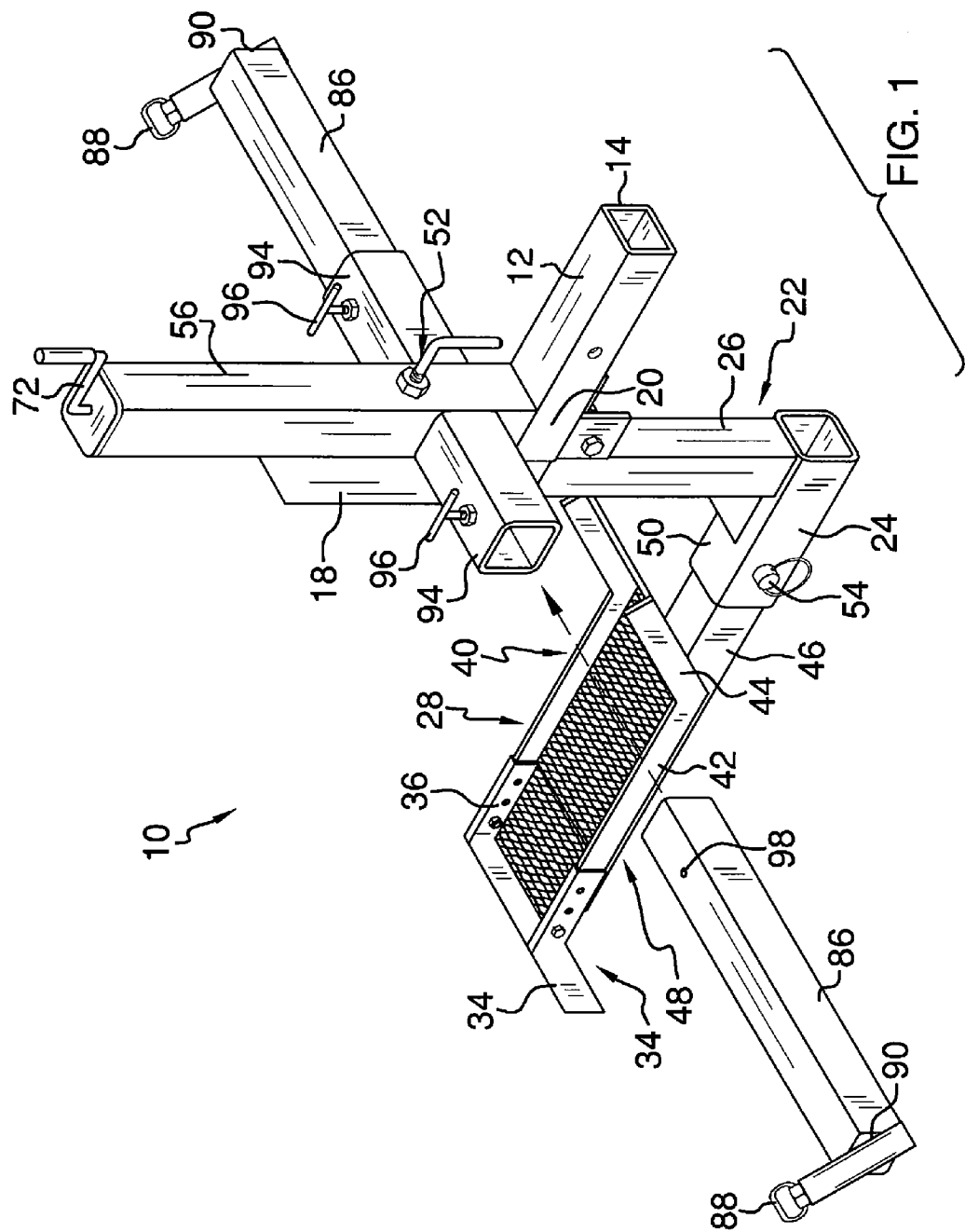
FIG. 1 is a top front side perspective view of a motorcycle dolly hitch assembly according to an embodiment of the disclosure.
Figure 2:
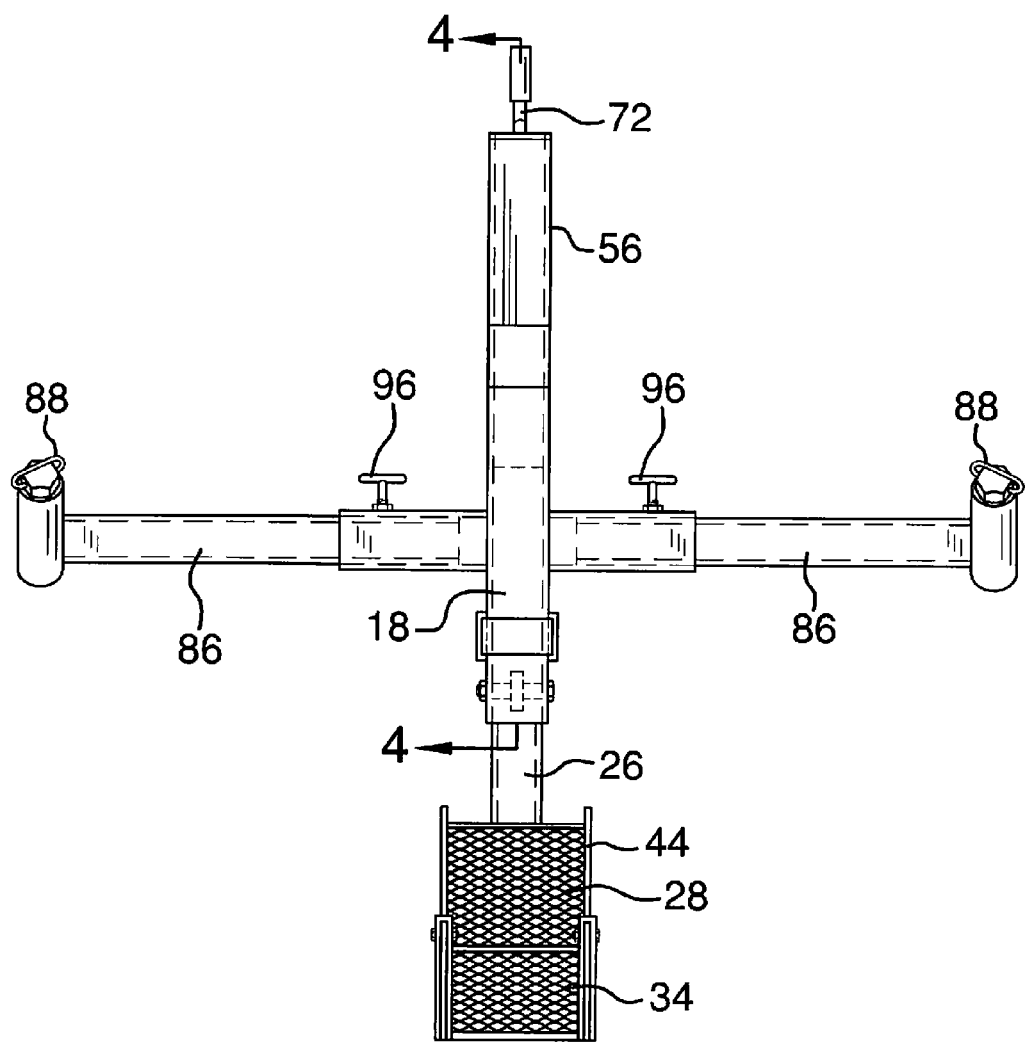
FIG. 2 is a back view of an embodiment of the disclosure.
Figure 3:
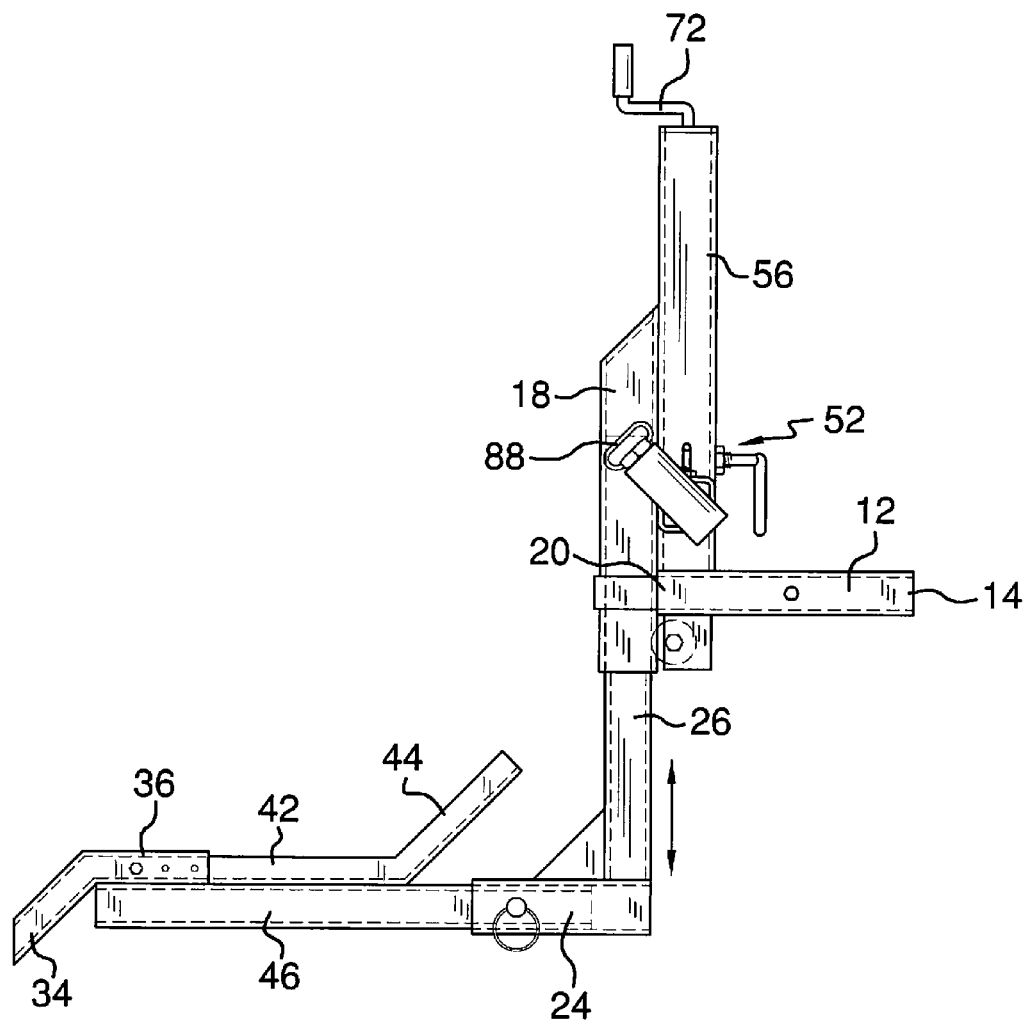
FIG. 3 is a side view of an embodiment of the disclosure.
Figure 4:
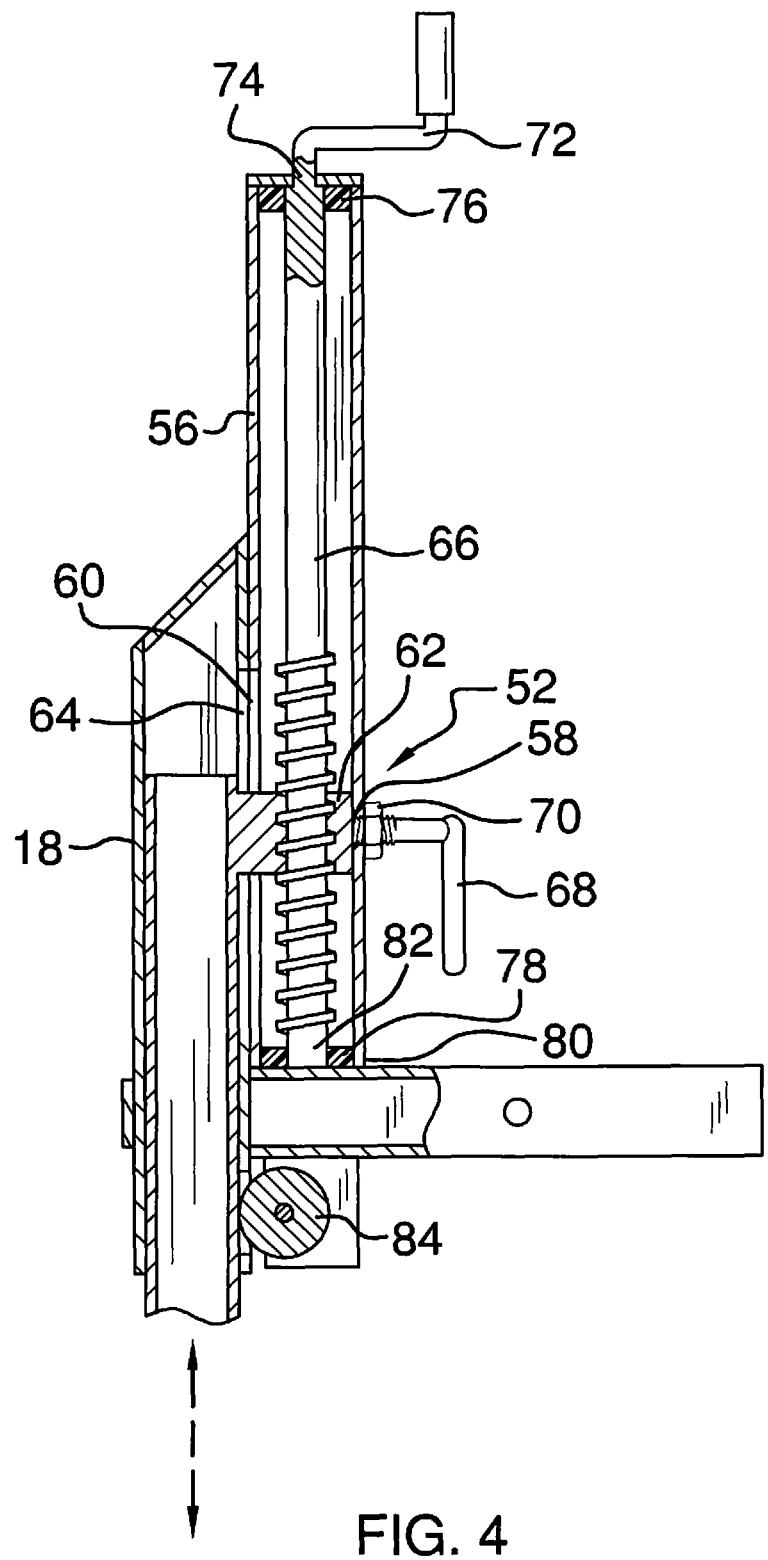
FIG. 4 is a cross-sectional view of an embodiment of the disclosure taken along line 4-4 of FIG. 2.
Figure 5:
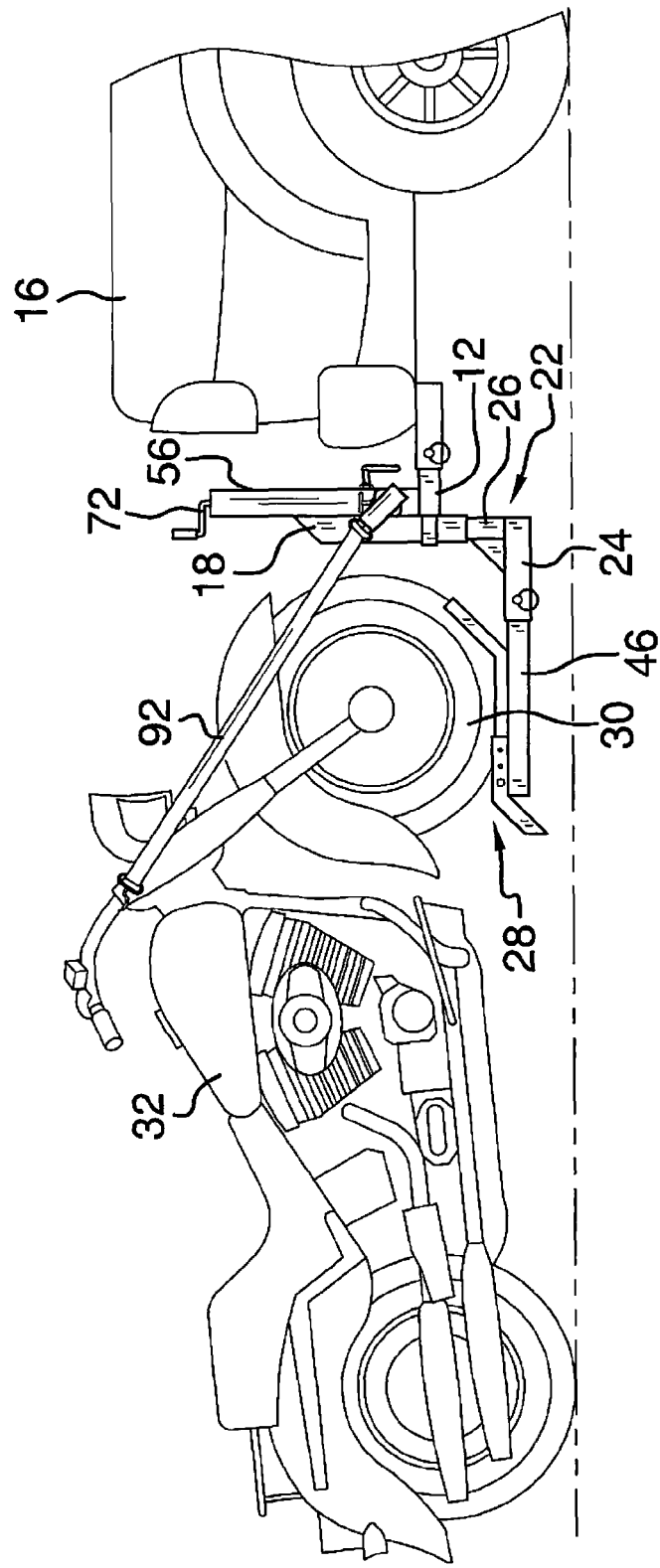
FIG. 5 is a side view of an embodiment of the disclosure in use.

With reference now to the drawings, and in particular to FIGS. 1 through 5 thereof, a new dolly device embodying the principles and concepts of an embodiment of the disclosure and generally designated by the reference numeral 10 will be described.

As best illustrated in FIGS. 1 through 5, the motorcycle dolly hitch assembly 10 generally comprises a hitch arm 12 having a first end 14 configured for coupling to a vehicle 16. A support sleeve 18 is coupled to a second end 20 of the hitch arm 12. A support member 22 has a first arm 24 and a second arm 26. The second arm 26 of the support member 22 is transverse to the first arm 24 of the support member 22. The second arm 26 is slidably inserted into the support sleeve 18. A cradle 28 is configured for supporting a wheel 30 of a motorcycle 32. The cradle 28 is coupled to the first arm 24 of the support member 22. The cradle 28 comprises a first portion 34 including a main section 36 and a ramp section 38. The cradle 28 further comprises a second portion 40 having a base section 42 and an upwardly extending stop section 44. The main section 36 of the first portion 34 is substantially coplanar with the base section 42 of the second portion 40 when the first portion 34 is coupled to the second portion 40. The first portion 34 of the cradle 28 may be removably coupled to the second portion 40 wherein the main section 36 may actually rest upon the base section 42 of the second portion 40. A bar 46 may be coupled to a bottom 48 of the cradle 28. The first arm 24 of the support member 22 comprises a cradle sleeve 50 selectively receiving the bar 46 wherein the cradle 28 is removably coupled to the support member 22. A cradle locking pin 54 is selectively insertable through the cradle sleeve 50 and the bar 46 wherein the cradle 28 is secured in a static position relative to the support member 22.

A locking mechanism 52 is mechanically coupled to the second arm 26 of the support member 22 and the support sleeve 18 wherein a position of the support member 22 is lockable into a static position relative to the support sleeve 18. A tube 56 is coupled to and extends upwardly from the hitch arm 12 abutting the support sleeve 18. An aperture 58 extends through the tube 56. A slot 60 extends through the tube 56. The slot 60 is positioned opposite the aperture 58. A projection 62 is coupled to and extends from the second arm 26 of the support member 22. The projection 62 extends out of a slit 64 in the support sleeve 18 and into the tube 56 through the slot 60 in the tube 56. A worm gear 66 is positioned in the tube 56. The worm gear 66 extends through and engages the projection 62 wherein rotation of the worm gear 66 moves the projection 62 in the slot 60. Thus, a position of the support member 22 is adjusted relative to the hitch arm 12. A lock handle 68 may extend through and threadingly engage the aperture 58. The lock handle 68 frictionally engages the projection 62 when the lock handle 68 is turned wherein the projection 62 is securable in a static position relative to the tube 56 when the projection 62 is aligned with the aperture 58 in the tube 56. A locking nut 70 may be coupled to the lock handle 68. The locking nut 70 selectively secures the lock handle 68 in a tightened position. A crank 72 is coupled to a top 74 of the worm gear 66. The crank 72 extends out of the top 74 of the tube 56. An upper bushing 76 may be coupled to the top 74 of the tube 56 with the worm gear 66 extending through the upper bushing 76. A lower bushing 78 may also be positioned at a bottom 80 of the tube 56. The worm gear 66 has a lower end 82 seated in the lower bushing 78.

A guide wheel 84 may be coupled to the hitch arm 12 under the second end 16 of the hitch arm 12. The guide wheel 84 abuts the second arm 26 of the support member 22 wherein the guide wheel 84 facilitates sliding the second arm 26 of the support member 22 in the support sleeve 18.

A pair of side arms 86 may be coupled to and extend from the tube 56. A pair of loops 88 may be provided with each loop 88 being coupled to a free end 90 of an associated one of the side arms 86. Each loop 88 is configured for coupling to a strap 92 coupled to the motorcycle 32 wherein the motorcycle 32 is secured on the cradle 28. A pair of arm receivers 94 is provided. Each arm receiver 94 is coupled to and extends from the tube 56. Each side arm 86 is removably received in an associated one of the arm receivers 94. A pair of arm locks 96 may also be utilized with each arm lock 96 being inserted through an associated one of the arm receivers 94 into a hole 98 in one of the side arms 86 inserted into the associated arm receiver 94. Thus, each side arm 86 is secured to the associated arm receiver 94.

In use, the hitch arm 12 is connected to a standard hitch receiver on the vehicle 16. The support member 22 may be lowered and the motorcycle 32 positioned with the wheel 30 on the cradle 28. The motorcycle 32 may be secured by the strap 92 and loops 88 on the side arms 86. The support member 22 may be elevated by manipulation of the worm gear 66 using the crank 72. When aligned, the lock handle 68 secures the support member 22 in the elevated position. The motorcycle 32 may then be towed by the vehicle 16 as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motorcycle dolly hitch assembly comprising;
a hitch arm having a first end configured for coupling to a vehicle;
a support sleeve coupled to a second end of said hitch arm;
a support member having a first arm and a second arm, said second arm being slidably inserted into said support sleeve;
a cradle configured for supporting a wheel of a motorcycle, said cradle being coupled to said first arm of said support member;
a locking mechanism mechanically coupled to said second arm of said support member and said support sleeve wherein a position of said support member is lockable into a static position relative to said support sleeve;
a tube coupled to and extending upwardly from said hitch arm, said tube abutting said support sleeve;
an aperture extending through said tube;
a slot extending through said tube, said slot being positioned opposite said aperture;
a projection coupled to and extending from said second arm of said support member, said projection extending out of a slit in said support sleeve and into said tube through said slot in said tube;
a worm gear positioned in said tube, said worm gear extending through said projection wherein rotation of said worm gear moves said projection in said slot wherein a position of said support member is adjusted relative to said hitch arm; and
a lock handle extending through said aperture, said lock handle frictionally engaging said projection when said lock handle is turned wherein said projection is securable in a static position relative to said tube when said projection is aligned with said aperture in said tube.

2. The assembly of claim 1, further comprising:
a bar coupled to a bottom of said cradle;
said first arm of said support member comprising a cradle sleeve selectively receiving said bar wherein said cradle is removably coupled to said support member; and
a cradle locking pin selectively insertable through said cradle sleeve and said bar wherein said cradle is secured in a static position relative to said support member.

3. The assembly of claim 1, further comprising a locking nut coupled to said lock handle, said locking nut selectively securing said lock handle in a tightened position.

4. The assembly of claim 1, further comprising a crank coupled to a top of said worm gear, said crank extending out of a top of said tube.

5. The assembly of claim 1, further comprising an upper bushing coupled to a top of said tube, said worm gear extending through said upper bushing.

6. The assembly of claim 5, further comprising a lower bushing positioned at a bottom of said tube, said worm gear having a lower end seated in said lower bushing.

7. The assembly of claim 1, further comprising a guide wheel coupled to said hitch arm under said second end of said hitch arm, said guide wheel abutting said second arm of said support member wherein said guide wheel facilitates sliding said second arm of said support member in said support sleeve.

8. The assembly of claim 1, further comprising said cradle comprising a first portion including a main section and a ramp section, said cradle further comprising a second portion having a base section and an upwardly extending stop section, said main section of said first portion being coplanar with said base section of said second portion when said first portion is coupled to said second portion.

9. The assembly of claim 8, further comprising said first portion of said cradle being removably coupled to said second portion.

10. The assembly of claim 1, further comprising said second arm of said support member being transverse to said first arm of said support member.

11. The assembly of claim 1, further comprising:
a pair of side arms coupled to and extending from said tube; and
a pair of loops, each loop being coupled to a free end of an associated one of said side arms, each loop being configured for coupling to a strap coupled to the motorcycle wherein the motorcycle is secured on said cradle.

12. The assembly of claim 11, further comprising:
a pair of arm receivers, each arm receiver being coupled to and extending from said tube;
each side arm being removably received in an associated one of said arm receivers.

13. The assembly of claim 12, further comprising a pair of arm locks, each arm lock being insertable through an associated one of said arm receivers into a hole in one of said side arms inserted into said associated arm receiver wherein said side arm is secured to said associated arm receiver.

14. A motorcycle dolly hitch assembly comprising;
a hitch arm having a first end configured for coupling to a vehicle;
a support sleeve coupled to a second end of said hitch arm;
a support member having a first arm and a second arm, said second arm of said support member being transverse to said first arm of said support member, said second arm being slidably inserted into said support sleeve;
a cradle configured for supporting a wheel of a motorcycle, said cradle being coupled to said first arm of said support member, said cradle comprising a first portion including a main section and a ramp section, said cradle further comprising a second portion having a base section and an upwardly extending stop section, said main section of said first portion being coplanar with said base section of said second portion when said first portion is coupled to said second portion, said first portion of said cradle being removably coupled to said second portion;
a bar coupled to a bottom of said cradle, said first arm of said support member comprising a cradle sleeve selectively receiving said bar wherein said cradle is removably coupled to said support member;
a locking mechanism mechanically coupled to said second arm of said support member and said support sleeve wherein a position of said support member is lockable into a static position relative to said support sleeve;
a cradle locking pin selectively insertable through said cradle sleeve and said bar wherein said cradle is secured in a static position relative to said support member;
a tube coupled to and extending upwardly from said hitch arm, said tube abutting said support sleeve;
an aperture extending through said tube;
a slot extending through said tube, said slot being positioned opposite said aperture;
a projection coupled to and extending from said second arm of said support member, said projection extending out of a slit in said support sleeve and into said tube through said slot in said tube;
a worm gear positioned in said tube, said worm gear extending through said projection wherein rotation of said worm gear moves said projection in said slot wherein a position of said support member is adjusted relative to said hitch arm;
a lock handle extending through said aperture, said lock handle frictionally engaging said projection when said lock handle is turned wherein said projection is securable in a static position relative to said tube when said projection is aligned with said aperture in said tube;
a locking nut coupled to said lock handle, said locking nut selectively securing said lock handle in a tightened position;
a crank coupled to a top of said worm gear, said crank extending out of a top of said tube;
an upper bushing coupled to a top of said tube, said worm gear extending through said upper bushing;
a lower bushing positioned at a bottom of said tube, said worm gear having a lower end seated in said lower bushing;
a guide wheel coupled to said hitch arm under said second end of said hitch arm, said guide wheel abutting said second arm of said support member wherein said guide wheel facilitates sliding said second arm of said support member in said support sleeve;
a pair of side arms coupled to and extending from said tube;
a pair of loops, each loop being coupled to a free end of an associated one of said side arms, each loop being configured for coupling to a strap coupled to the motorcycle wherein the motorcycle is secured on said cradle;
a pair of arm receivers, each arm receiver being coupled to and extending from said tube, each side arm being removably received in an associated one of said arm receivers; and
a pair of arm locks, each arm lock being insertable through an associated one of said arm receivers into a hole in one of said side arms inserted into said associated arm receiver wherein said side arm is secured to said associated arm receiver.

15. A motorcycle dolly hitch assembly comprising:
a hitch arm having a first end configured for coupling to a vehicle;
a support sleeve coupled to a second end of said hitch arm;
a support member having a first arm and a second arm, said second arm being slidably inserted into said support sleeve;
a cradle configured for supporting a wheel of a motorcycle, said cradle being coupled to said first arm of said support member;
a locking mechanism mechanically coupled to said second arm of said support member and said support sleeve wherein a position of said support member is lockable into a static position relative to said support sleeve; and
said cradle comprising a first portion including a main section and a ramp section, said cradle further comprising a second portion having a base section and an upwardly extending stop section, said main section of said first portion being coplanar with said base section of said second portion when said first portion is coupled to said second portion.

16. The assembly of claim 15, further comprising:
a bar coupled to a bottom of said cradle;
said first arm of said support member comprising a cradle sleeve selectively receiving said bar wherein said cradle is removably coupled to said support member; and
a cradle locking pin selectively insertable through said cradle sleeve and said bar wherein said cradle is secured in a static position relative to said support member.

17. The assembly of claim 15, further comprising a guide wheel coupled to said hitch arm under said second end of said hitch arm, said guide wheel abutting said second arm of said support member wherein said guide wheel facilitates sliding said second arm of said support member in said support sleeve.

18. The assembly of claim 15, further comprising said first portion of said cradle being removably coupled to said second portion.

19. The assembly of claim 15, further comprising said second arm of said support member being transverse to said first arm of said support member.

20. The assembly of claim 15, further comprising:
a tube coupled to and extending upwardly from said hitch arm, said tube abutting said support sleeve;
an aperture extending through said tube;
a slot extending through said tube, said slot being positioned opposite said aperture;
a projection coupled to and extending from said second arm of said support member, said projection extending out of a slit in said support sleeve and into said tube through said slot in said tube;
a worm gear positioned in said tube, said worm gear extending through said projection wherein rotation of said worm gear moves said projection in said slot wherein a position of said support member is adjusted relative to said hitch arm;
a lock handle extending through said aperture, said lock handle frictionally engaging said projection when said lock handle is turned wherein said projection is securable in a static position relative to said tube when said projection is aligned with said aperture in said tube;
a pair of side arms coupled to and extending from said tube;
a pair of loops, each loop being coupled to a free end of an associated one of said side arms, each loop being configured for coupling to a strap coupled to the motorcycle wherein the motorcycle is secured on said cradle;
a pair of arm receivers, each arm receiver being coupled to and extending from said tube;
each side arm being removably received in an associated one of said arm receivers; and a pair of arm locks, each arm lock being insertable through an associated one of said arm receivers into a hole in one of said side arms inserted into said associated arm receiver wherein said side arm is secured to said associated arm receiver.

* * * * *